United States Patent
Prutu

(10) Patent No.: US 10,981,731 B2
(45) Date of Patent: Apr. 20, 2021

(54) ACTIVE CONTROL SYSTEM FOR BELT CONVEYORS

(71) Applicant: Victor N Prutu, Cumming, GA (US)

(72) Inventor: Victor N Prutu, Cumming, GA (US)

(*) Notice: Subject to any disclaimer, the term of this patent is extended or adjusted under 35 U.S.C. 154(b) by 0 days.

(21) Appl. No.: 16/740,428

(22) Filed: Jan. 11, 2020

(65) Prior Publication Data

US 2020/0223642 A1 Jul. 16, 2020

Related U.S. Application Data

(60) Provisional application No. 62/791,757, filed on Jan. 12, 2019.

(51) Int. Cl.
*B65G 43/08* (2006.01)
*B65G 47/31* (2006.01)
*B65G 43/10* (2006.01)

(52) U.S. Cl.
CPC .......... *B65G 43/08* (2013.01); *B65G 43/10* (2013.01); *B65G 47/31* (2013.01); *B65G 2203/044* (2013.01); *B65G 2811/0673* (2013.01); *B65G 2811/095* (2013.01)

(58) Field of Classification Search
CPC ...... B65G 47/52; B65G 47/682; B65G 43/10; B65G 43/08; B65G 47/31; B65G 2811/095; B65G 2811/0673; B65G 2203/044
USPC ................. 198/575, 461.1, 370.01
See application file for complete search history.

(56) References Cited

U.S. PATENT DOCUMENTS

| | | | |
|---|---|---|---|
| 4,150,743 A * | 4/1979 | Lazzarotti | B07C 1/04 198/444 |
| 4,567,410 A * | 1/1986 | Martin | B65G 43/08 198/341.03 |
| 5,318,167 A | 6/1994 | Bronson et al. | |
| 5,672,815 A | 9/1997 | Prutu | |
| 6,264,042 B1 | 7/2001 | Cossey | |
| 6,460,683 B1 * | 10/2002 | Pfeiffer | B65G 43/08 198/460.1 |
| 6,540,063 B1 * | 4/2003 | Fallas | B65B 5/105 198/419.3 |
| 6,690,995 B2 | 2/2004 | Prutu | |
| 6,860,381 B2 * | 3/2005 | Newsom | B65G 47/261 198/781.05 |
| 7,982,764 B2 | 7/2011 | Kadaba | |
| 2003/0141165 A1 * | 7/2003 | Reznik | B65G 47/30 198/434 |
| 2012/0175225 A1 * | 7/2012 | Breen | B65G 43/10 198/571 |

(Continued)

FOREIGN PATENT DOCUMENTS

CN 204038480 U 12/2014

*Primary Examiner* — James R Bidwell
(74) *Attorney, Agent, or Firm* — Gronholm Patent Services

(57) ABSTRACT

The present concepts comprise various methods and apparatuses for the sorting of packages and other articles or objects in a cost- and time-efficient manner such that the life of the apparatuses for sorting and transporting said objects is extended. Likewise, the integrity of the conveyed articles is likewise maintained, such that the articles are not damaged or altered. This is done by detecting and rectifying Jamming, Overload, and Overflow. Another purpose of the concept is to eliminate the subjectivity of the human operator; stoppage due to the jamming or overload excepted.

20 Claims, 7 Drawing Sheets

(56) References Cited

U.S. PATENT DOCUMENTS

2016/0121909 A1\* 5/2016 Herzog .................... B61D 7/02
                                                                414/518
2019/0202642 A1\* 7/2019 Schroader .............. B65G 39/18

\* cited by examiner

OVERALL APPARATUS 5

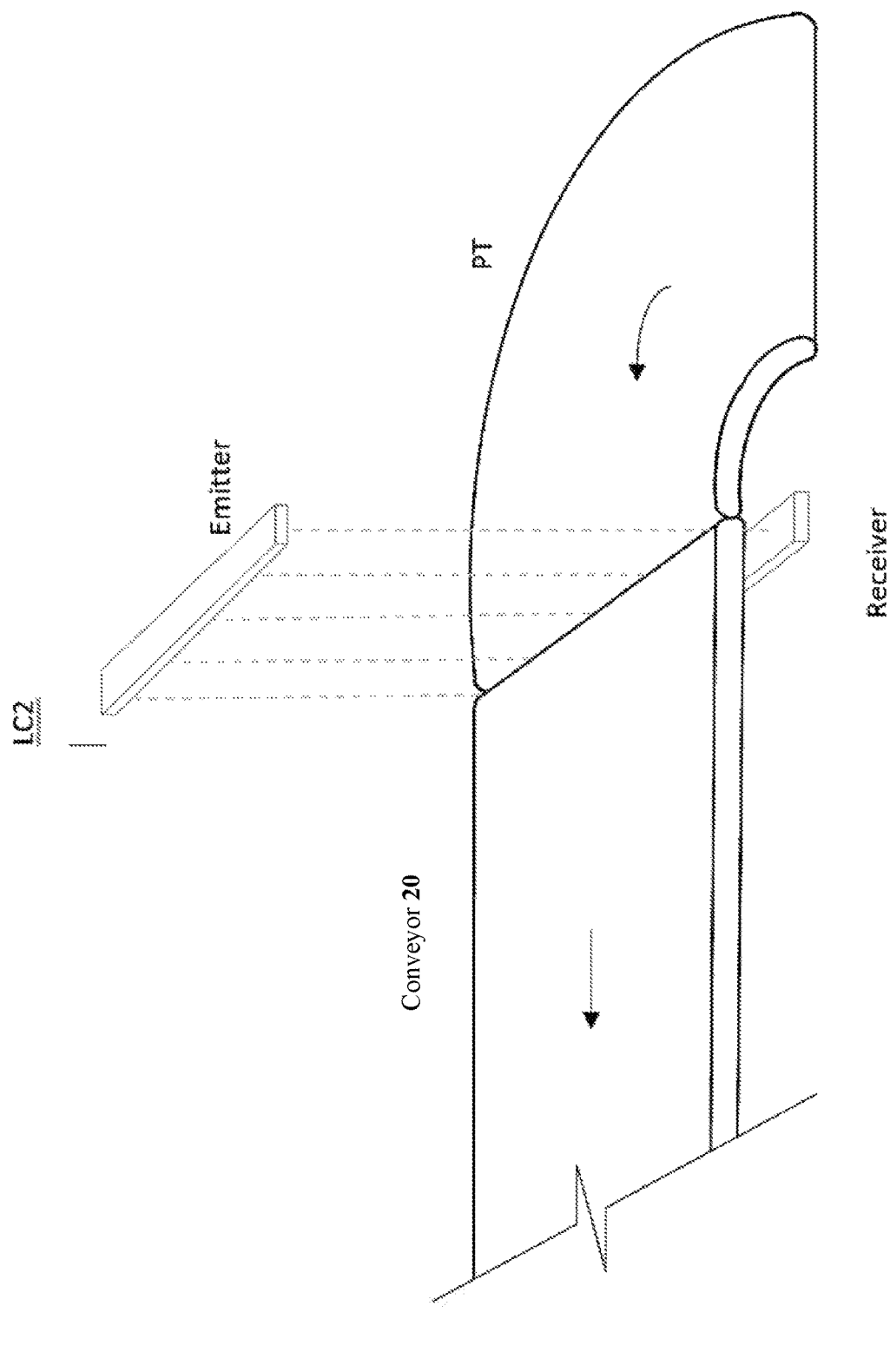

Fig. 4

MAIN Bloc Diagram

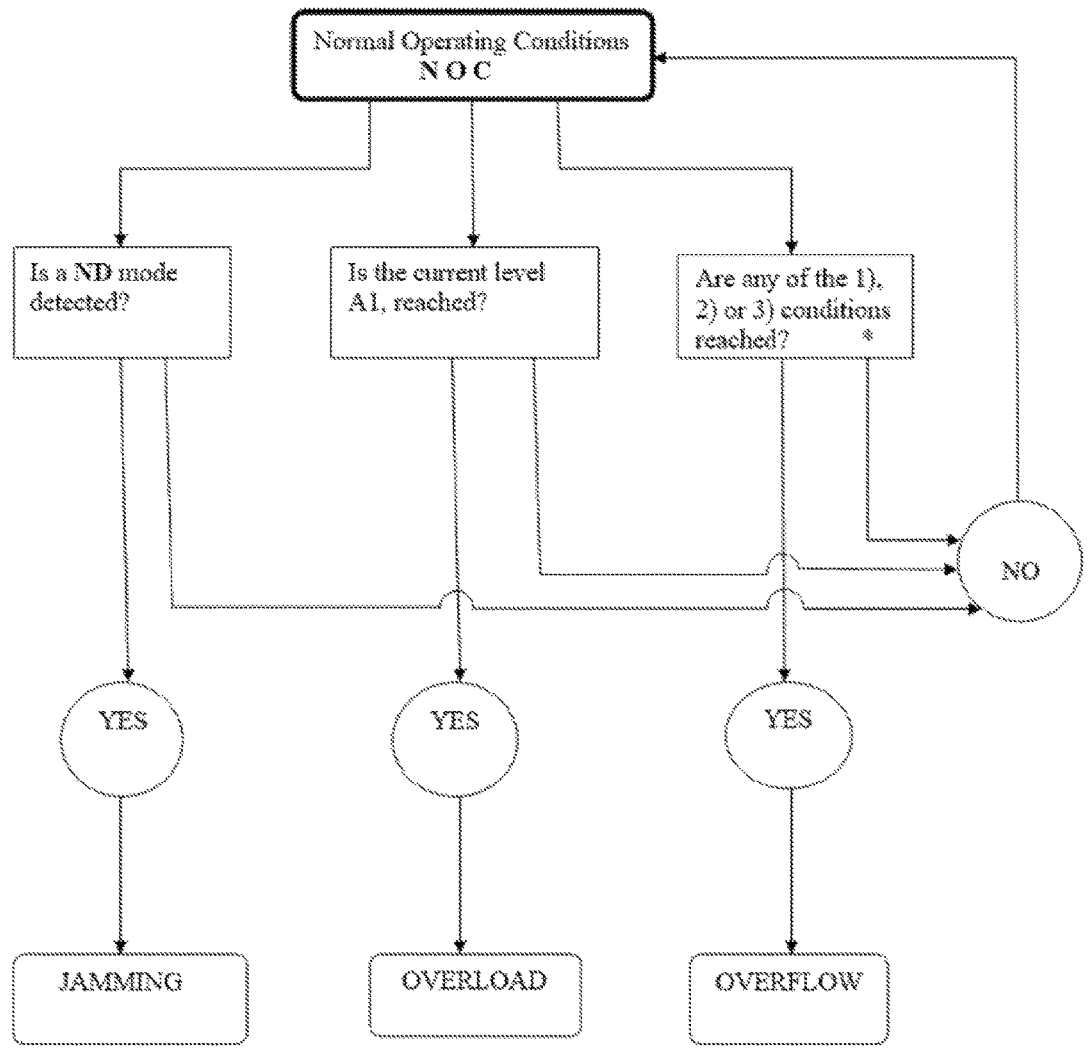

*Conditions
1) Is one or more of the PEs of the LC1 and/or LC2 blocked for more than T6, but – in the same time - all the other PEs, are still in the D mode?
2) Is one or more of the PEs of the LC1 and/or LC2 still blocked after T6 + T7, but – in the same time – all the other PEs are still in the D mode? (See also Figure 6)
3) Is one or more of the PEs of the LC1 and/or LC2 blocked after T6 + T7 + T8, but – in the same time – all the other PEs are still in the D mode? (See also Figure 6).

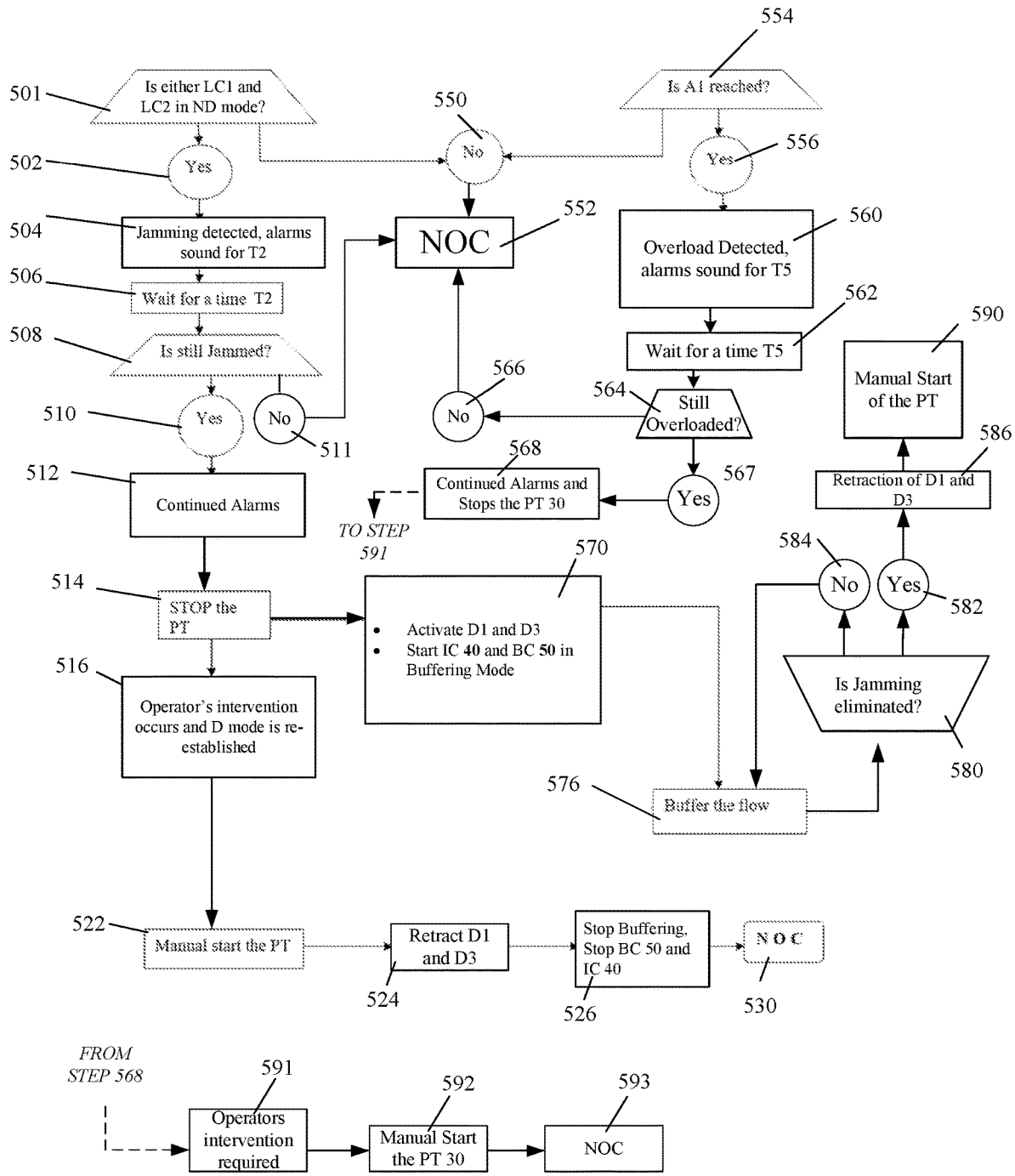

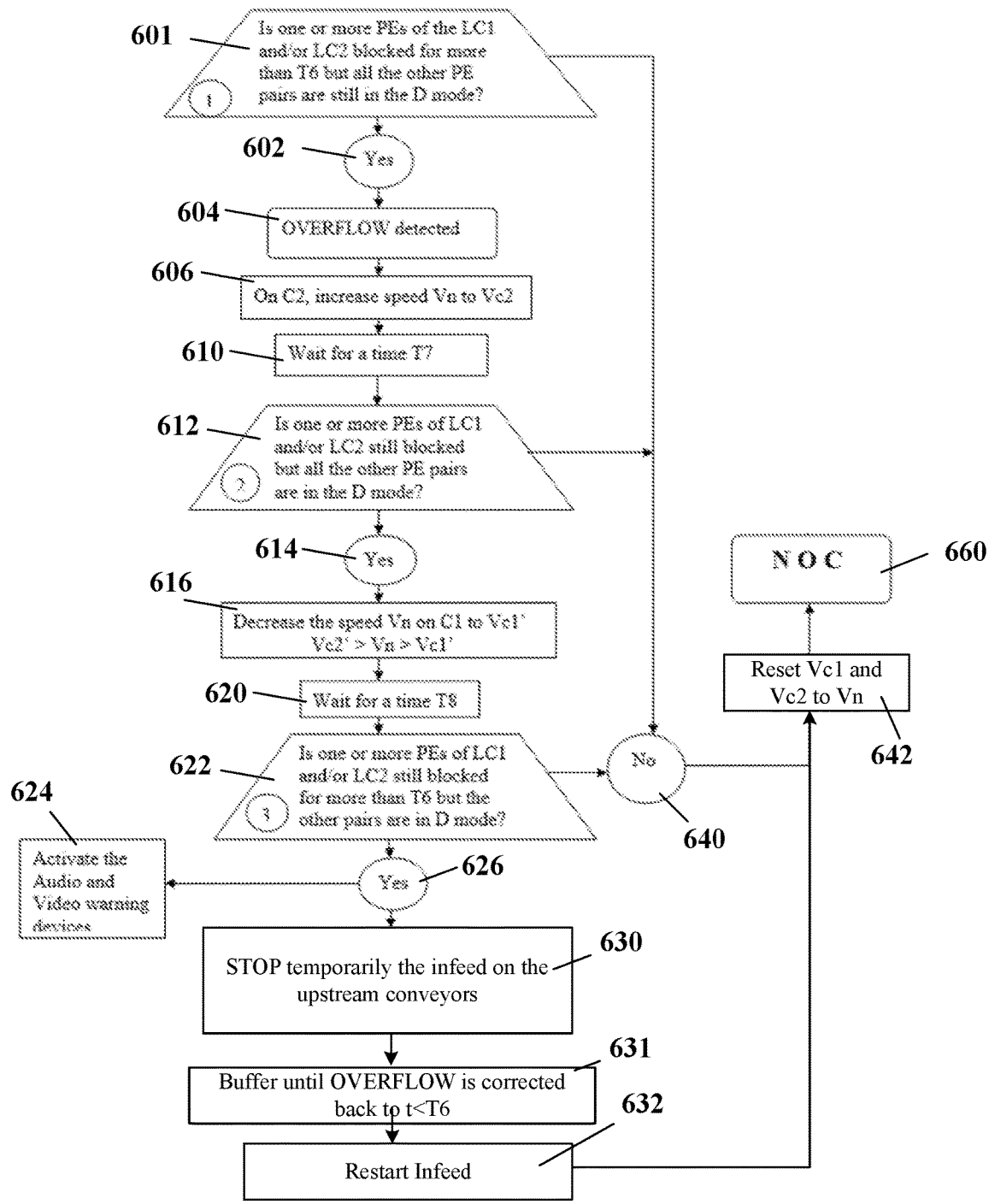

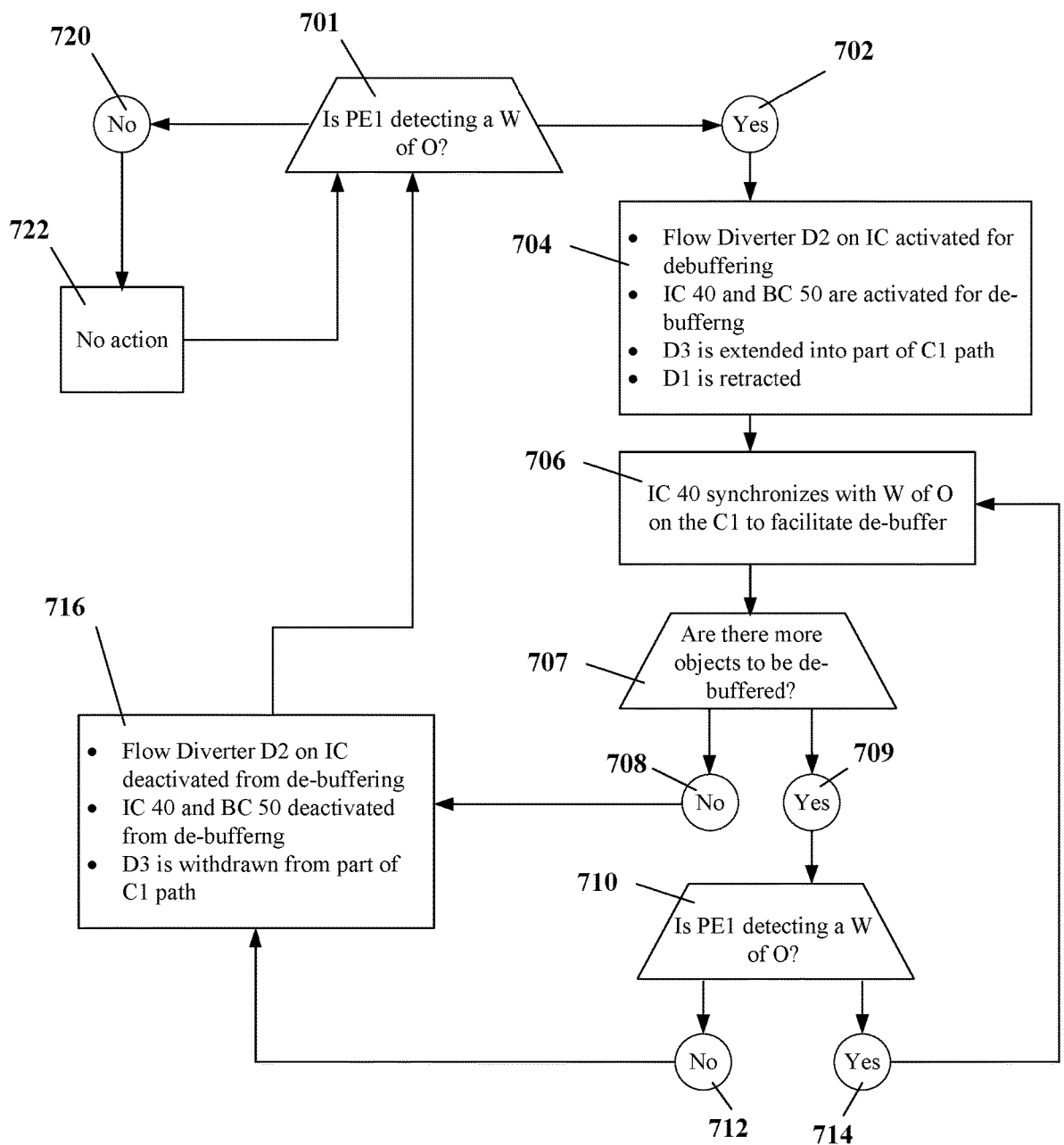

ACTIVE CONTROL SYSTEM FOR BELT CONVEYORS

COPYRIGHT STATEMENT

A portion of the disclosure of this document contains material subject to copyright protection. No objection is made to facsimile reproduction of the patent document or this disclosure as it appears in the Patent and Trademark Office files or records, but otherwise any and all rights, including copyright(s), are reserved.

FIELD

This disclosure relates generally to sorting and conveying systems.

INTRODUCTION

This section provides some introduction to various matters relating to the invention mentioned herein, but it should be understood that this should not be construed as prior art to the invention; certain materials may be included, referenced, or alluded to in this section that may be inventions of the inventor noted herein. This section is simply included to include some introduction for the sake of the reader, some of which may be background to the invention, and some which is not.

The present concepts relate generally to sorting systems which include the use of belt conveyors, as well of methods and apparatuses for controlling said belt conveyors.

U.S. Pat. No. 7,982,764 B2; "Apparatus for monitoring a package handling system" Author—Nagesh Kadaba, U.P.S.

U.S. Pat. No. 8,630,537 B2 "Apparatus for monitoring a package handling system" Author—Nagesh Kadaba, U.P.S.

CN 204038480 U "Belt side-turn preventing device of belt conveyor" Author—China

U.S. Pat. No. 5,318,167 A "Control system for power driven conveyor line" Author—Steven R. Bronson, Russell W. Kettelson, Newcor Inc.

U.S. Pat. No. 6,264,042 B1 Bilateral Sorter Author—Victor Nicolas Prutu, U.P.S.

U.S. Pat. No. 6,690,995 Method and apparatus for measuring and diverting an object from a high-speed conveyor Author—Victor Nicolas Prutu, U.P.S.

U.S. Pat. No. 5,672,815 Method and apparatus for measuring outside dimensions and the center of gravity of a package Author—Victor Nicolas Prutu, U.P.S.

SUMMARY

The present concepts comprise various methods and apparatuses for the sorting of packages and other articles or objects in a cost- and time-efficient manner such that the life of the apparatuses for sorting and transporting said objects is extended. Likewise, the integrity of the conveyed articles is likewise maintained, such that the articles are not damaged or altered. Other advantages are also included, which will be discussed below.

Under one general aspect of the invention is provided a method of controlling the flow of objects conveyed by a conveyor along a conveying path, said method including the following steps: A) Monitoring said flow of objects; B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value; C) If after Step B, a predetermined time passes and overflow continues, then objects along said conveying path are buffered to a separate overflow conveyor; D) If during Step A, object jamming is detected on said conveying path, then objects along said conveying path are buffered to a separate buffering conveyor, wherein object jamming includes a determination that one or more objects are not moving due to at least one parcel being stopped at a location where it should otherwise be moving; E) If after Step D, a predetermined time passes and jamming continues, then said conveyor is stopped, and induction to said conveyor is also stopped; and F) If during Step A, overload is detected on the conveying path, then said conveyor is stopped, and induction to said conveyor is also stopped, wherein overload of a conveyor is determined by looking at amperage and how long the amperage draw goes above a threshold.

Under another aspect of the invention is provided the general method as noted above, in Step A, said flow monitoring is measured at least in part by sensing devices.

Under another aspect of the invention is provided the general method as noted above, wherein said sensing devices include a light curtain.

Under another aspect of the invention is provided the general method as noted above, wherein said sensing devices include a light sensor.

Under another aspect of the invention is provided the general method as noted above, wherein in Step A, said conveying path can include a power turn conveyor, or the intersection of one or more conveyors.

Under another aspect of the invention is provided the general method as noted above, wherein in Step E, said conveyor speed modification comprised speeding up said downstream conveyor portion.

Under another aspect of the invention is provided the general method as noted above, wherein in Step B, said conveyor speed modification comprised slowing down said upstream conveyor portion.

Under another aspect of the invention is provided the general method as noted above, wherein in Steps C and D, objects along said conveying path are buffered to said separate buffering conveyor in "first in last out" order.

Under another aspect of the invention is provided the general method as noted above, wherein in Steps C and D, an induction conveyor used between main conveyor path and buffering conveyor.

Under another general aspect of the invention is provided a method of controlling the flow of objects conveyed by a conveyor along a conveying path, said method including the following steps: A) Monitoring said flow of objects; B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value; C) If after Step B, a predetermined time passes and overflow continues, then objects along said conveying path are buffered to a separate overflow conveyor; D) If during Step A, object jamming is detected on said conveying path, then objects along said conveying path are buffered to a separate overflow conveyor, wherein object jamming includes a determination that one or more objects are not moving due to at least one parcel being stopped at a location where it should otherwise be moving; E) If after Step D, a predetermined time passes and jamming continues, then said conveyor is stopped, and induction to said conveyor is also stopped; F) If during Step A, overload is detected on the conveying path, then said conveyor is stopped, and induction to said conveyor is also stopped, wherein overload of a conveyor is determined by looking at amperage and how long the amperage draw goes above a threshold; and G) If overload or jamming is corrected to suitable levels, parcels are debuffered back into the flow.

Under another aspect of the invention is provided the last general method as noted above, wherein in Step A, said conveying path can include a power turn conveyor, or the intersection of one or more conveyors.

Under another aspect of the invention is provided the last general method as noted above, wherein in Steps C and D, objects along said conveying path are buffered to said separate buffering conveyor in "first in last out" order.

Under another aspect of the invention is provided the last general method as noted above, wherein in Steps C and D, an induction conveyor used between main conveyor path and buffering conveyor.

Under another aspect of the invention is provided the last general method as noted above, wherein in Steps C and D, an induction conveyor used between said main conveyor path and buffering conveyor, said induction conveyor being configured to speed up and slow down in order to insert items into gaps between other items on said main conveyor path.

Under another aspect of the invention is provided the last general method as noted above, further comprising the step of allowing for the manual removal of objects from said main conveyor by operating personnel.

Under another general aspect of the invention is provided a method of controlling the flow of objects along a conveying path through a transition point, including the following steps: A) Monitoring said flow of objects; B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value; C) If after Step B, a predetermined time passes and overflow continues, then objects along said conveying path are buffered to a separate overflow conveyor; D) If during Step A, object jamming is detected on said conveying path, then objects along said conveying path are buffered to a separate overflow conveyor, wherein object jamming includes a determination that one or more objects are not moving due to at least one parcel being stopped at a location where it should otherwise be moving; E) If after Step D, a predetermined time passes and jamming continues, then said conveyor is stopped, and induction to said conveyor is also stopped; F) If during Step A, overload is detected on the conveying path, then said conveyor is stopped, and induction to said conveyor is also stopped, wherein overload of a conveyor is determined by looking at amperage and how long the amperage draw goes above a threshold; and G) If overload or jamming is corrected to suitable levels, determining a window of opportunity in order to re-introduce buffered objects into a path, reintroducing objects by use of window of opportunity if overflow or jamming is fixed Under another aspect of the invention is provided the last general method as noted above, wherein in Step A, said conveying path can include a power turn conveyor, or the intersection of one or more conveyors.

Under another aspect of the invention is provided the last general method as noted above, wherein in Steps C and D, objects along said conveying path are buffered to said separate buffering conveyor in "first in last out" order.

Under another aspect of the invention is provided the last general method as noted above, wherein in Steps C and D, an induction conveyor used between said main conveyor path and buffering conveyor, said induction conveyor being configured to speed up and slow down in order to insert items into gaps between other items on said main conveyor path.

Under another aspect of the invention is provided the last general method as noted above, further comprising the step of allowing for the manual removal of objects from said main conveyor by operating personnel.

These and other aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 3 illustrates the positioning of a light curtain such as LC2 above the conveying path.

FIG. 4 shows a flow diagram illustrating how the overall system checks for Jamming, Overload, and Overflow.

FIG. 5 shows a flow diagram illustrating Jamming and Overload. Buffering steps are also included.

FIG. 6 shows a flow diagram illustrating Overflow. Buffering steps are also included.

FIG. 7 shows a flow diagram illustrating De-Buffering.

DETAILED DESCRIPTION

Introduction

Figure 1:
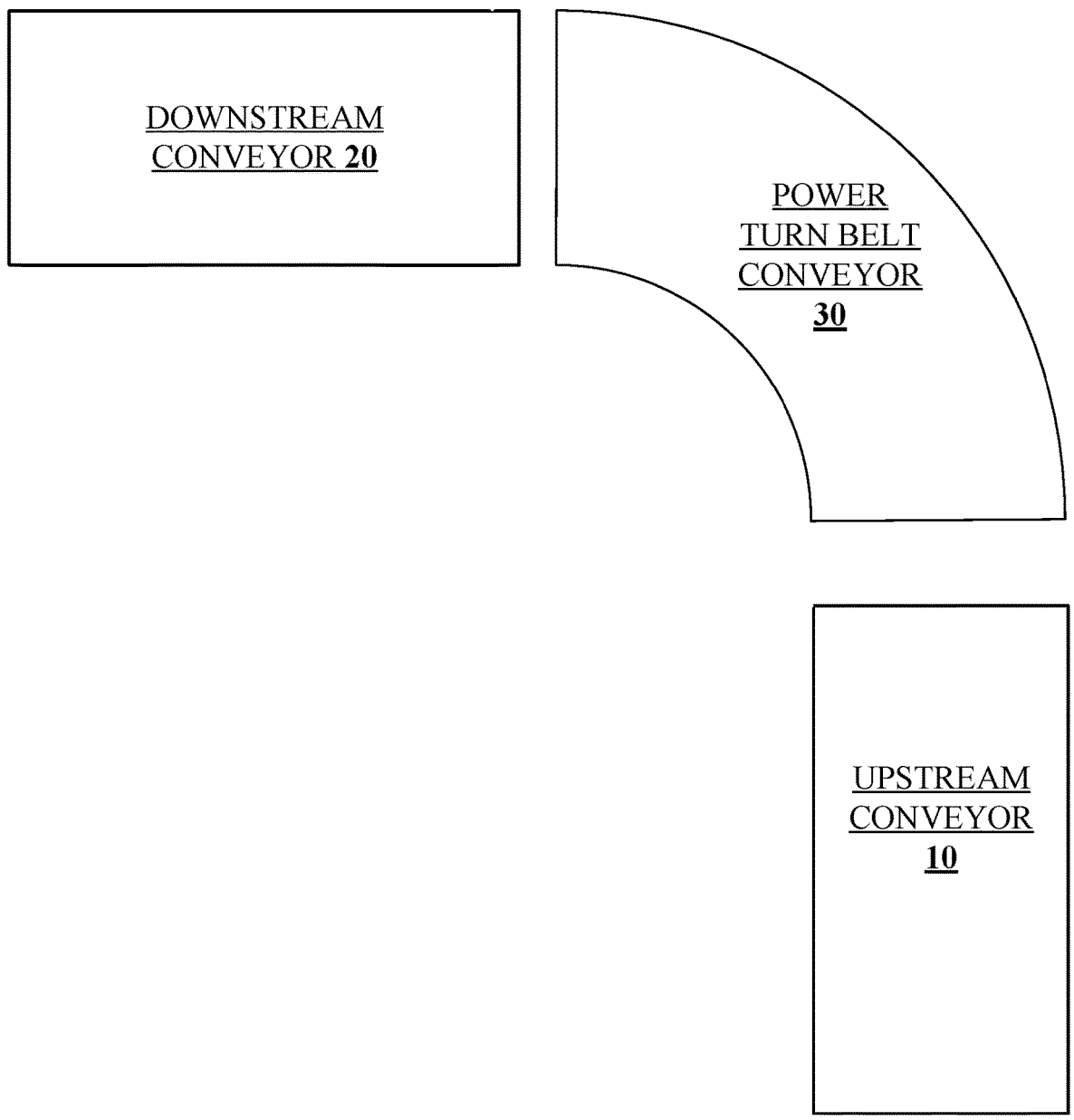
FIG. 1 shows a portion of the overall apparatus 5.

The present concepts now will be described more fully hereinafter with reference to the accompanying drawings, in which some, but not all embodiments of the concepts are shown. These concepts may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:

| | |
|---|---|
| 5 | Overall Apparatus |
| 10 | Upstream Conveyor (aka C1) |

-continued

| | |
|---|---|
| | 12 variable frequency drive motor |
| 20 | Downstream Conveyor (aka C2) |
| | 22 variable frequency drive motor |
| 30 | Power Turn Conveyor (aka PT) |
| | 32 variable frequency drive motor |
| | 34 current sensor (aka CS) |
| 40 | Induction Conveyor (aka C3) |
| | 42 variable frequency drive motor |
| 50 | Buffering Conveyor (aka BC) |
| | 52 variable frequency drive motor |
| LC1 | Light Curtain just downstream of Conveyor 10 |
| LC2 | Light Curtain just upstream of Conveyor 20 |
| LC3 | Light Curtain between conveyor 40 and 50 |
| D1 | Diverter (pivoting) which moves objects across conveyor 10 |
| D2 | Diverter (stationary diverting surface) which moves objects across conveyor 40. |
| D3 | Diverter (pivoting) which moves objects across conveyor 10 (aka pusher) |
| PE1 | Through Beam Light Sensor |

DISCUSSION

General Conveying Notations

For the record, the definition of singulation conveying is to convey a group of side by side products and/or other randomly placed products along a conveyor path, and as they move downstream, to form them into a straight line with proper spacing and justification. Un-singulated objects on belt conveyors do not have such order.

The current concepts disclosed herein address the efficiency of various sorting systems which use belt conveyors in an un-singulated environment, thus increasing their reliability. One significant purpose is to maximize the life and the integrity of the conveying equipment, as well as to preserve the integrity of the conveyed materials/objects (minimize damage).

As will be seen in more detail below, this is achieved by monitoring and addressing certain exceptional conditions, also referenced as "exceptions", that present themselves during the conveying process, namely overflow, overload and jamming. These three conditions are frequently encountered when transporting un-singulated objects on the belt conveyors.

The present concept also introduces the element of buffering the flow with an active control solution by observing the occasional "windows of opportunity" occurring in the operation. Another novelty is the active control de-buffering of the accumulated objects.

The overflow can be identified as a preliminary condition, which randomly ends up in jamming. Based on the nature of the transported objects, the overflow and the jamming could be associated with an overload situation.

Conveyors exposed to overflow, overload and jamming present a premature wear and tear of the conveying belt plus an exceeding solicitation of the drive units. Practical experience indicates that the power turn belt conveyors are the area particularly exposed to these kinds of difficulties.

Object jamming includes a determination (via sensors and predetermined rules described later) that one more objects not moving due to at least one parcel is stopped at a location that it should otherwise be moving.

Object overflow includes a determination (via sensors and predetermined rules described later) that the density of objects on conveyor is higher than a predetermined upper value.

Overload of a conveyor determined (via sensors and predetermined rules described later) by looking at amperage and how long the amperage draw goes above a threshold.

The present concept presents a system that recognizes and discerns when jamming, overload or overflow occurs. This is done by properly monitoring the load and the flow of the conveyed objects and is identifying which specific situation is encountered. Then, the system shall make—automatically—the suitable decisions in order to protect the conveying belts and the driving units and preserve integrity of the conveyed objects.

The present concept is considering the most common—and difficult—situation of the "un-singulated" flow. Here, the objects are transported on the conveyor system in bulk without being justified or singulated.

In complex sorting systems, to change the direction of the flow, "power turn" conveyors are used. Practical experience shows that this is the area where most of the described problems occur. Power turn conveyors can be generally understood as conveyors that provide bias against conveyed items as the items are conveyed along a nonlinear path, typically in the same horizontal plane. Power turn belt conveyors provide such a function by use of a belt which is driven by a motor or other motive source.

Reference is now made to FIG. 1, which is a top plan illustrative view of a portion of a conveyor system 5, including an upstream conveyor 10, a power turn belt conveyor 30 downstream of the upstream conveyor 10, and a downstream conveyor 20 which is downstream of the power turn belt conveyor 30.

Figure 2:
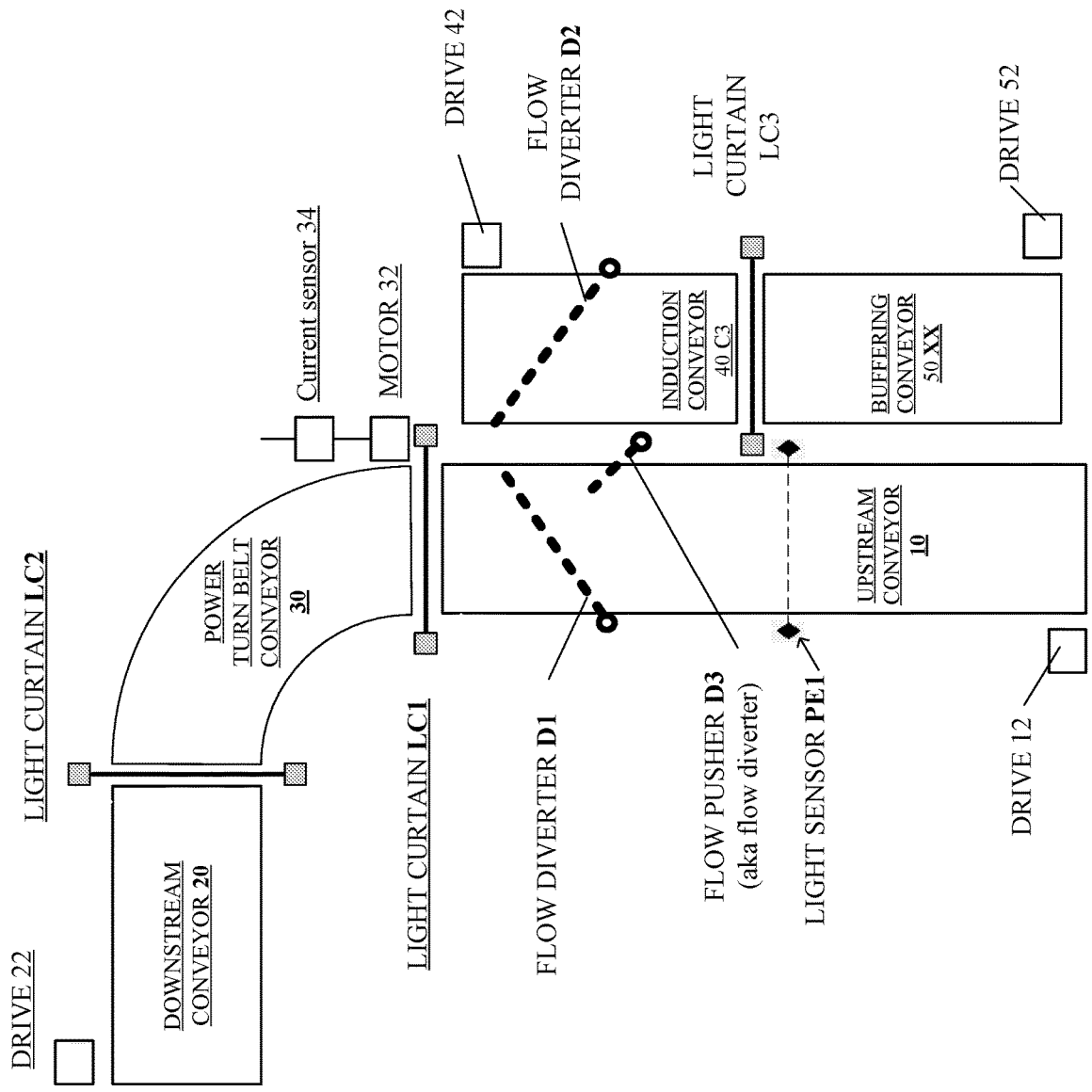
FIG. 2 shows additional portions of the overall apparatus 5.

Reference is also now made to FIG. 2, which is a top plan illustrative view of a portion of a conveyor system 5 including an upstream conveyor 10, a power turn belt conveyor 20 downstream of the upstream conveyor 10, and a downstream conveyor 20 which is downstream of the power turn belt conveyor 30, as well as other elements.

Elements also shown in FIG. 2 include induction conveyors 40 and 50, as well as corresponding variable frequency drive motors 42 and 52 (which drive conveyors 40 and 50).

Elements also shown in FIG. 2 include a variable frequency drive 12 (which drives conveyor 10) a variable frequency drive motor 22 (which drives conveyor 20), and a variable frequency drive motor 32 (which drives conveyor 30).

Specific Hardware and Mode Notations

Conveyor 10 is assisted by the variable frequency drive 12.

Conveyor 20 is assisted by the variable frequency drive 22.

Power Turn conveyor 30, is assisted by its own variable frequency drive 32.

Current Sensor device 34 which is monitoring the load (respectively the Amps) on the power turn conveyor 30.

LC1 and LC2 are through-beam array light sensors (light curtains), located at each end of the power turn conveyor 30 (as indicated in FIG. 1). However, it must be noted that these devices are assembled in a 90-degree rotated position (the light sensor arrays support assemblies of the Emitter and respectively of the Receiver, and are parallel with the surface of the conveyor); see FIG. 3.

For the purpose of this application, two distinct statuses of the beam array light sensors are defined—a dynamic mode of operation D and a non-dynamic mode (static) ND.

In the D mode, the pairs of photo sensors are continuously changing their status from closed to open and back, indicating the detection of a normal flow of conveyed objects. This is determined over a predetermined time period, which as explained below is T1.

In the static ND mode, the pairs of photo sensors are not changing their status (are either closed or open), indicating a problem in the system, or that no more objects are in the system (all open). In the case of all open, the warnings go on, and then the systems stop, as there are no more objects in the system.

Vn—Nominal velocity of the conveying system. Under normal conditions, the same velocity Vn=Vct exits on all the conveyors and is constant velocity all over in the system. On the Power Turn Conveyor 30 it should be calibrated with a tachometer monitoring the medial line of the belt.

VC10 (Vc1)—velocity of conveyor 10
VC20 (Vc2)—velocity of conveyor 20
VC30 (Vpt)—velocity of the power turn conveyor belt 30 measured on the center line; Vpt=Vn
NOC—normal operating condition (see the bloc diagram FIG. 4)
D—dynamic mode (when the light sensors are continuously switching to on/off)
ND—non-dynamic mode (light sensors are settled on either "on" or "off" and not switching)
Jamming Occasionally, the objects on the Power Turn Conveyor 30 conveyor are "jammed" into each other and cannot be transferred any more freely towards the next conveyor 20. This is a dangerous situation for the physical integrity of the conveyed objects, as well as for the surface material of the conveying belt. This is generally referenced as "Jamming", and is typically a Power Turn Conveyor 30 conveyor phenomena, although jamming could occur in different locations.

To detect Jamming, object flow is monitored at the locations of the light curtains LC1 and LC2. If any portion of either of these light curtains is blocked for more than a preselected time period (T1), that light curtain is said to be in ND mode (nondynamic mode). If either of the light curtains LC1 and LC2 are in ND mode, then the system is considered to be in Jammed status.

Note that only one LC needs to be blocked. It is possible that the jamming occurs at LC1 level only; if it is generated at LC2, then in a short time LC1 too shall indicate a ND reading. As an observation, and indifferent of where Jamming occurs, some of the Photo Sensors shall be continuously closed and some continuously open; with a mention that when LC1 is the affected area, then—after a time t—all LC2 Photo Sensors shall be open.

Once in Jammed status, the system provides warning for a second preselected time period (T2), to give an assisting operator time to assess and "de-jam" object flow, while the conveyors are still moving.

If within the interval of time T2 the jamming situation is eliminated, and the light curtains are not blocked for another time T1, then system status is switched from Jammed mode to NOC.

If in the interval of time T2 the jamming situation is not eliminated, and the light curtains continue to be blocked for time T2, then the conveyors are stopped and are not restarted until the assisting operator restarts them.

Time period T1 is the set-up time when any pair of photo-eyes from the array of light curtains LC1 and/or LC2 are allowed to be continuously blocked by the flow of the conveyed objects without triggering a warning signal; audio (a Buzzer), visual (Strobe lights), or both. At a minimum, T1 could be defined as the maximum amount of time allowed (at a given speed) to the longest base dimension of the longest conveyed object, to clear the monitoring photo-eye (s); a safety margin of 50%, should be considered for the situation when—the un-singulated—objects are clustering "shoulder to shoulder". Then T1=1.5 longest dimension/Vn.

It should be understood that if a sensor pair is blocked for time period T1, it is considered to be in ND mode (nondynamic mode) under present system operation.

Time period T2 starts at the end of T1; at this moment, the alarm signal(s) is/are triggered. T2 is the amount of time when the audio and visual signals remain active, before a subsequent correction action is reached. This is a security time provided to allow the intervention of the attending operator.

Time period T3=T1+T2. T3 is the time after which the conveyor's power is cut off and the in-feed of the conveyed objects is stopped. T3 is mainly designed to preserve the integrity of the belt's material as well as that of the conveyed objects.

Reference is now made to FIG. 5, which is a process flow diagram showing processes associated with Jamming and Overload.

Jamming is defined as a condition that occurs when:
one (or more) of the Photo Sensor pairs pertaining to the LC1 is blocked longer than the pre-established time T1 (detecting a non-dynamic (ND) mode), OR
one (or more) of the Photo Sensor pairs pertaining to the LC2 is blocked longer than the pre-established time T1 (detecting a non-dynamic (ND) mode).

Said another way, Jamming could start either at the level of LC1 or LC2 when one or more pairs of Photo Sensors are blocked for more than T1. After a time t>T1, the other end of the power turn conveyor shall register too an ND mode. For example, Jamming starting at LC1 shall observe—after a time "t"—an ND mode at LC2, where pairs of Photo Sensors remain continuously open (no flow going on anymore). When Jamming is initiated at LC2, then—after a time "t"—an ND mode shall be observed at LC1, where pairs of Photo Sensors become continuously closed (due to the accumulation of incoming objects).

Reference is now made to FIG. 5, which represents the process step of determining if Jamming and/or Overload has been detected. The immediately following discussion will relate to Jamming. Overload will be discussed later.

Step 501 determines if either of the light curtains LC1 and LC2 are in ND mode (non-dynamic mode). It should be understood that for purposes of this discussion, determination of ND vs. D mode presupposes an evaluation over time period T1.

If so, the process goes to Step 502 ("Yes"). If not, the process goes to Step 550 ("No") which then goes to Step 552 (NOC).

At Step 504, Jamming has been established, and suitable alarms sound. The process then moves to 506 and waits for a time T2. During this T2, suitable audio warning devices (Buzzers) and/or visual warning devices (Strobe Lights), stay on for the amount of time T2.

T2 is designed to provide a reasonable amount of time for the intervention of an assisting operator to assess and to "de-jam" the situation without stopping the conveyors and disrupting the operation.

After T2 times out in Step 506, the process goes to Step 508, which checks again to determine if the system is jammed. This is done by again checking if the light curtains LC1 and LC2 are in ND mode (non-dynamic mode) by being unblocked for a time T1.

If the jamming situation is eliminated, and the LC1 becomes unblocked for a time T1, and the Normal Operating Condition, NOC is re-established as the process goes from Step 511 to 550.

If the jamming situation is not eliminated, the process goes from Step 510 to Step 512, which continues alarms, and then moves to Step 514, in which the Power Turn belt conveyor 30 is stopped.

Overload

Load on the power turn conveyor is monitored by monitoring the amperage draw by its drive motor. If the monitored amps reach a predetermined threshold A1 for a time period T4, warning signals (e.g., buzzers/strobes) are activated for a time period T5, while the power turn conveyor continues to operate. This gives time for the attending operator's intervention. If within this time period T5, the amperage draw falls below the predetermined threshold for a time period bigger than T4, then the warning signals are terminated and the power turn conveyor continues to operate.

If within this time period T5, the amperage draw does not fall below the predetermined threshold, power to both the power turn conveyor and the upstream conveyor 10 is interrupted until the attending operator remedies the problem.

A—Monitored Amps on the Power Turn Conveyor 30.

A1—Amps threshold on the Power Turn Conveyor 30; it is a setup parameter in the Current Sensor 34, which indicates the maximum load (overload) allowed on the Power Turn Conveyor 30.

Note: A<A1 indicates that the system operates in the normal parameters.

T4—starts when the monitored Amps reach the preset A1 threshold.

Represents the Current Sensor's CS setup time before the security alarm devices (audio and/or visual) are triggered. Note that T4=0 for motor maximum protection; however, occasional load "spikes" occur in the operation.

T5—starts at the end of T4 and triggers the warning signals. It represents the allowed set up time for the attending operator's intervention. At the end of T5, the motor's power is cut off to preserve the integrity of the system in general and of the motor in particular.

Note that in some special situations, the accumulated weight of the conveyed objects on the power turn conveyor 30 approaches the maximum load of the Power Turn Conveyor 30's motor. If this takes too long, it could damage the motor. This situation is detected by the Current Sensor (CS) device 34, connected to the motor 32 of the Power Turn Conveyor 30 (see FIG. 1).

Referring now again to FIG. 5, at Step 554, the system monitors the load on the power turn conveyor 30 by monitoring the amperage draw by its drive motor 32. Such monitoring is done by current sensor 34. If the monitored amps reach a predetermined threshold A1 for a time period T4, ("Yes", at Step 556) the system moves from Step 556 to Step 560, during which warning signals (e.g., buzzers/strobes) are activated for a time period T5, while the power turn conveyor continues to operate. The system has thus detected Overload.

T5 is designed to provide a reasonable amount of time for the intervention of an assisting operator to assess and to remedy the situation without stopping the conveyors and disrupting the operation.

After T5 times out in Step 562, the process goes to Step 564, which checks again to determine if the system is in Overload. This is done by again checking if the monitored amps reach a predetermined threshold A1 for a time period T4. Note that the system could also be checking for same during T5.

If the Overload situation is eliminated, and such a threshold is not reached, the process goes to "No" at Step 566, and then resumes NOC at Step 552.

If the Overload situation is not eliminated, the process goes from Step 564 to Step 567 ("Yes"), which leads to Step 568 which continues alarms and stops the PT 30 in order for an attendant to address the matter. From there the process goes to Step 591 (Operators intervention required), to Step 592 (Manual Start of PT 30), and finally to Step 593 (NOC).

Corrective Actions to Stoppage from Jamming

Should the Power Turn belt conveyor 30 be stopped at Step 514, the system proceeds to do two things—to allow the operator to intervene (Step 516), and to buffer (initiated at Step 570). Both steps are initiated from Step 516.

At Step 516, the system allows for the operator to intervene, while checking for D mode on Sensors LC1 and LC2. Once D mode is reached on Sensors LC1 and LC2, the process goes to Step 522 which allows for manual start of the Power Turn Conveyor 30. After that at Step 524 D1 and D3 are retracted, then at Step 526 buffering is stopped, and at Step 530 NOC is reached.

At Step 570, the system prepares to buffer by Activating D1 and D3 and starting induction conveyor 40 and Buffering Conveyor 50 in buffering mode. Once Step 570 is complete, flow is buffered at Step 576.

After Step 576, the system checks at Step 580 if Jamming is eliminated. If not (Step 584), the process goes to Step 576 and continues buffering. If so, (Step 582), the process goes to Step 586 (retraction of D1 and D3) and then to Step 590 which allows for manual start of the Power Turn Conveyor 30.

Overflow

Monitoring "Overflow" is very important in securing an even flow and to diminish, possibly eliminating, the downtime of the sorting operation. Overflow is usually a preceding condition of Jamming and Overloading. In the "overflow" situations where no jamming has yet been detected, the conveyed objects are traveling end-to-end, side-by-side or closely grouped, which results in the monitoring PE1 on the upstream conveyor 10 to be continuously blocked (in ND mode, as explained with respect to Jamming); this is redundant and confirming information. A proper setup and the right corrections made at this time are very important in preventing (and possibly eliminating) jamming and overloads.

The present concept defines and detects Overflow as being when one or more of the photo sensor pairs of the light curtains LC1 and LC2 are blocked for a time longer than T6. Note that only one or more of the photo sensor pairs of the light curtains LC1 and LC2 needs to be blocked for a time longer than T6 in order to detect Overflow.

Since T6 is a time which is longer than T1 (typically 3×T1), but only one of light curtains LC1 and LC2 need to be blocked it is possible and expected that Overflow can be detected before Overload is detected. It is also possible and expected that Overload can be detected before Overflow is detected. This T6 time is a function of the size and shape of the objects conveyed (and of course, is a function of the speed of the conveyor). For example, an Overflow with heavy objects could trigger Overload. However, just a few heavy objects traveling without an Overflow condition, could also trigger an Overload situation.

Overflow detection and correction is generally as follows. If any one of the light curtains is blocked for more than a predetermined time T6, the speed of the downstream conveyor is increased. The system then waits for a predetermined time T7.

If, after T7, any one of the light curtains is blocked for more than another predetermined time T6, the speed of the upstream conveyor is decreased. The system then waits for a predetermined time T8.

If, after T7, no light curtains are blocked for more than T6, the speed of the upstream conveyor is reset to its normal operating speed.

If, after T8, any one of the light curtains is blocked for more than a predetermined time T6, infeed to the upstream conveyors is stopped, and suitable warnings are activated.

If, after T8, no light curtains are blocked for more than T6, the speeds of the upstream and the downstream conveyors are reset to their normal operating speeds.

T6—a setup time allowed for a free flow—traveling with an already detected "overflow" condition—before any action is taken; see the Overflow chapter. T6 is a function of the speed of the conveyor, as well as of the size and shape of the conveyed objects. Its value was, by practical observation, selected as T6=3×T1. However, this is an average value; it is advisable to be adjusted to the needs of each specific operation.

T7—a setup time and it is a function of the speed of the conveyor, the shape and the size of the objects transported. It is the time when the same pairs of photo-sensors of the optical array LC1 and/or LC2 are both allowed to be blocked before a correction is required.

T8—the allowed time after the first overflow correction (see the description at the paragraph "Overflow", below), before applying the second overflow correction. During this time, both LC1 and LC2 are still blocked or blocked more than T1, but "no-overload" or "jamming" condition is present yet.

Vc1'—velocity of upstream conveyor 10 after the second overflow correction; Vc1'<Vpt.

Vc2'—velocity of conveyor downstream conveyor 20 after the second overflow correction; Vc2'>Vpt.

T8—is the allowed time after the second correction action, before the next decision is reached (assuming that "no-overload" condition is present).

NOC Normal Operating Condition (LC1 and LC2 "On" and "Off" within T1; A—remains at values inferior to A1; Vc1=Vpt=Vc2=Vn).

Reference is now made to FIG. 6. Step 601 determines if one or more PE pairs (photo eye pairs) of the LC1 and/or LC2 are blocked for more than T6, while all the other PE pairs are still in the D mode. If so, the process moves to Step 602, which is the "Yes" decision. If not (Step 640), the process goes to NOC status at 660.

If Step 602 is reached, then the process goes to Step 604, and notes an OVERFLOW detection. This is confirmed by the PE1 being continuously blocked; this is just a redundant information, but not a decision maker.

At this point the process moves to Step 606, which increases the speed Vn of the downstream conveyor 20 to Vc2.

After Step 606 the process waits for a time T7, and then goes to Step 612.

Step 612 determines if one or more PE pairs of the LC1 and/or LC2 are still blocked for more than T6, while all the other PE pairs are still in the D mode. This is a "second" T6 in the sequence—the first one being the T6 that ran in Step 601. It should be noted that this is the same decision step as Step 601. If so, the process moves to Step 614, which is the "Yes" decision. If not (Step 640), the process goes to NOC status at 660.

From Step 614 the process moves to Step 616, which increases the speed on the downstream conveyor 20 to Vc2' and decreases the speed Vn of the upstream conveyor 10 from Vn to Vc1', where Vc2' is greater than Vn, which is greater than Vc1'.

From Step 616 the process moves to Step 620.

At Step 620 the process waits for a predetermined time T8, and then moves to Step 622. T8 is a time period is to be established based on the nature of the conveyed objects; is shall be a specific of the operation.

At Step 622 the process determines once again if one or more PE pairs of the LC1 and/or LC2 are still blocked for more than T6, while all the other PE pairs are still in the D mode. It should be noted that this is the same decision step as Step 601. This is a "third" T6 in the sequence—the first one being the T6 that ran in Step 601 and the second one that ran in Step 612. If so, the process moves to Step 626, which is the "Yes" decision. If not, the process moves to Step 640 (No blockage), which moves the process to Step 642 (setting the conveyor speeds to Vn), and then to NOC at Step 660.

From Step 626, two processes are initiated, at 624 there is an activation of audio and visual warning devices, and at 630 the infeed to the upstream conveyor 10 is stopped. The process then goes to Step 631 to buffering such as described in Steps 570-576-580-584 in FIG. 5, with the difference being that at the Yes/No decision is whether Overflow has been eliminated instead of Jamming. Once Overflow has been eliminated and flow is re-established to the normal parameters where t<T6, the process goes from Step 631 to Step 632 at which the in-feed resumes, and the process then goes to Step 642 to reset the conveyor speeds to normal speeds and the system then goes to NOC at Step 660.

Note that infeed to the upstream conveyor 10 as described in the previous paragraph may be specific to each operation and should not be limited. Infeed could be stopped manually or active-controlled as well. There are many possibilities and there should be no limitations. In one possible case, there could be another Buffering loop, a stoppage of those conveyors, a preliminary (time controlled slow down speeds), and/or possibly a supplementary access to the (already existing) BC, etc., or even a manual intervention.

Until the "overflow" condition is eliminated (an arbitrary safety pre-set time is to be used), other additional corrective actions (not shown in the figures) are:

slow even more the speed of the upstream conveyor 10; also, accordingly decrease the speed on all the other upstream conveyors.

activate a first level of warnings (visual and possibly audio).

Buffering

Buffering is used to divert objects from the normal conveying path (upstream conveyor 10 to power turn conveyor 30 to downstream conveyor 20) to a buffering zone alongside the normal conveying path. This buffering zone is configured to occasionally accept surplus objects (buffer) in order that they may be introduced later (de-buffer) when lesser flows on the normal conveying path allow.

Buffering is initiated when the Power Turn Conveyor 30 has been stopped due to Jamming and/or Overload (see FIG. 5, Step 514). Buffering can also be initiated when Overflow has been detected (see FIG. 6, Step 631).

Buffering is performed by activating a flow diverter D1 which diverts flow from the upstream conveyor to an adjacent induction conveyor 40 (which is alongside the upstream conveyor). Flow is then sent from the induction conveyor 40 to the buffering conveyor 50.

Buffering conveyor 50 is a long, buffering/accumulation conveyor. Induction conveyor 40 is a facilitator, both accepting objects from and delivering objects to the main flow.

All buffered objects go to the buffering conveyor. This is the simplest process. The induction conveyor is a short conveyor for induction purposes only—it should remain clean when on stand-by. All buffered objects must be contained on the Buffering Conveyor 50, without blocking the LC3.

Flow diverter D1 rotates to block and divert the incoming flow towards the Buffering Conveyor 50. It rotates back when buffering is no more necessary, such as during de-buffering or normal unbuffered flow.

BC—Buffering conveyor with reversible motion. AKA Buffering Conveyor 50.

D1—Diverter; assembled on upstream conveyor 10. Pivots in and out of place. An upgraded variant of the concept could include an endless belt in order to guide and align the objects and secure an easy flow.

D2—Diverter; assembled on induction conveyor 40. The overall framework is stationary, although—in an upgraded variant of the concept—there could be an endless reversible belt in order to guide and align the objects and secure an easy flow. Note that its belt path is not moved in and out of position (like the others D1 and D3); it is positioned at one end of the induction conveyor 40. The belt being reversible, it helps objects to get onto the induction conveyor 40 during buffering, and off the induction conveyor 40 during de-buffering.

D3—Flow pusher; assembled on upstream conveyor 10 to facilitate the induction of the de-buffered flow (is embedded alongside of upstream conveyor 10, right before the injection site. Pivots in and out of place. Includes an endless belt in order to guide and align the objects and secure an easy flow. Objects traveling on upstream conveyor 10 close to the right edge of the conveyor shall be an impediment for the de-buffered objects to be properly inducted in the stream of upstream conveyor 10 (possibly generating a local jamming). This "clears a path" on the right side of upstream conveyor 10 for objects being de-buffered, thus avoiding jamming at this level. Note that the inducted objects from IC 40 should accelerate towards speeds superior to Vn in order to "push" the flow from upstream conveyor 10 in order to find a comfortable fit in the flow.

Induction Conveyor 40 (aka C3 aka IC 40)—Injection conveyor for buffering and de-buffering. Based on the Window of Opportunity position, detected on the upstream conveyor 10, Induction Conveyor 40 shall accelerate (or decelerate) the de-buffered objects, to "fit" in the size and position of the W of O.

LC3—through-beam array light sensors (light curtain). Must be noted that this device too, is assembled in a 90-degree rotated position (the Emitter and respectively the Receiver supports, are parallel with the surface of the conveyor) just like the LC1 and LC2; see FIG. 2.

PE1—Light sensor detecting the end of the flow and possibly confirming a "window of opportunity" in the flow (for starting de-buffering) from upstream conveyor 10. PE1 is a thru beam Photo Sensor monitoring the traffic of the flow. When the flow is moving, occasionally should be some spaces observed by the PE1 as a confirmation of NOC. PE1 also serves as an identifier for the W of O.

VFD3—Variable frequency drive assisting Induction Conveyor 40 (to match the "window of opportunity" detected on the upstream conveyor 10). AKA drive 42.

Buffering is defined as an active-control solution to be triggered when Jamming-or Overflow occurs. The flow is directed towards a temporary storage to allow operator's intervention and to preserve the integrity of the conveyed objects as much as the integrity of the conveying belt.

Actions taken at buffering (see FIG. 5), are as follows:

At Step 570, activate the flow diverter D1—this shifts the flow towards conveyors induction conveyor 40 and buffering conveyor 50. In an ideal design, the flow diverter is a narrow vertical belt conveyor, with the belt moving in the buffering direction. Also at Step 570, the system activates the flow diverter D2, which is also a narrow vertical belt conveyor. Also at Step 570, the system induction conveyor 40 and buffering conveyor 50 move in the "buffering direction" in which objects are diverted from upstream conveyor 10 to induction conveyor 40, and finally to buffering conveyor 50.

LC3 monitors the status of the buffering conveyor 50. When LC3 detects a ND (non-dynamic situation) this is an indication to the system that the buffering conveyor is full. The time period T1 is likewise used here to determine ND. At this time both conveyors 40 and 50 are stopped, upstream conveyor 10 is stopped, and infeed to upstream conveyor 10 is stopped. When jamming is eliminated and operation resumes, the de-buffering shall have priority until LC1 observes an ND mode of continuously open.

De-Buffering

De-buffering is used to re-introduce objects from the buffering conveyor back into the normal conveying path, when traffic on the normal conveying path warrants. This is done when a window of opportunity ("W of O") presents itself on the normal conveying path. Most of the time it will be necessary to accelerate the objects to not miss the W of O.

A window of opportunity is determined by use of the Light Sensor PE1, which recognizes gaps in flow on the conveyor (assuming known conveyor speeds). When a suitable gap is recognized (by use of PE1 registering time gaps, confirmed by LC1) the buffering conveyor and the induction conveyor are reversed from the buffering direction to reintroduce objects into the normal conveying path. The speed of the induction conveyor is synchronized to match the W of O created on the upstream conveyor 10, while the Diverter D2 pushes objects from the induction conveyor to the upstream conveyor.

De-buffering (see FIG. 2 and the block diagram FIG. 7), is performed on two occasions:

first, is when a "window of opportunity", or "W of O", is detected; (this is when the conveyed objects are observed to be in "light traffic", which occurs during normal operation) and, the second one, is at the very end of the operation, when the last objects of the flow have crossed past the line of LC1. In fact, the second one be considered a type of the first in that a window of opportunity has been recognized after the last object has been conveyed.

Note that LC1 is a decision maker and PE1 acts as a confirming witness.

The trigger for a "light traffic"—which is presenting a W of O for de-buffering—is established based on the size of the conveyed objects, their weight, the speed of the upstream conveyor 10, as well as a percentage of the flow monitored by the LC1.

When a W of O is detected, the suitable plan of action is as follows (see also the flow diagram FIG. 7).

At Step 701, a determination is made if a W of O has been detected by use of the PE1.

If the answer from Step 701 is No, the process goes to Step 720, which leads to a no action step at 722 and the process returns to Step 701.

If the answer from Step 701 is Yes, the process goes to Step 702. From Step 704 the process goes to Step 704, in which the following processes are carried out or confirmed as existing:

Induction conveyor 40 and power turn belt conveyor 50 are activated for de-buffering
The Flow Diverter D2 on Induction conveyor 40 is activated for de-buffering
D3 is extended into part of upstream conveyor 10 path
D1 is retracted out of the upstream conveyor 10 path The process goes from Step 704 to Step 706, during which the de-buffering step is carried out, namely the re-introduction of objects into the normal conveying path. During Step 706, the buffering conveyor 50 and induction conveyor 40 move in the direction of de-buffering flow (towards flow on upstream conveyor 10). The flow diverter D2 guides the flow from induction conveyor 40 towards the upstream conveyor 10.

The flow pusher D3 is normally retracted (parallel with the side edge of upstream conveyor 10). During Step 706, flow pusher D3 rotates (10 to 15 deg), to push the flow on upstream conveyor 10 further towards the center of upstream conveyor 10 so as to allow an easier induction for the de-buffered objects.

During Step 706, induction conveyor 40 is acting as a "synchronizer"; accelerating or decelerating the injection in order to optimize the opportunity created in the flow of upstream conveyor 10. Another purpose of induction conveyor 40 is to take advantage of the possible intermittent W of Os occurring at short intervals.

The system keeps track of how many objects have been buffered at Step 707. If all objects have been de-buffered, the process goes from Step 708 to Step 716.

At Step 716 the Flow Diverter D2 on IC is deactivated from the de-buffering process. IC 40 and Buffering Conveyor 50 are likewise deactivated. D3 is withdrawn from the upstream conveyor 10 path and has no effect on flow. Flow Diverter D1 is already out of the path, so it remains unchanged.

If at Step 707 there is a determination that all objects have not been de-buffered, the process goes from Step 708 to Step 710, which continues to check if there is a W of O for the objects.

At Step 710, the system continues to check if there is a W of O for the objects. If the answer is Yes at Step 714, the process returns to Step 706 during which more items are de-buffered.

If the answer is No at Step 712, the process goes to Step 716 which was explained above.

Final Observations

As shown in FIG. 4, during NOC, the system continuously looks for Jamming (see also FIG. 5, Step 501,), Overload (see also FIG. 5, Step 554), and Overflow (see also FIG. 6, Step 601).

The present art addresses the common procedure where all the transporting elements have the same velocity.

It was practically observed that instead of the usual practice (with even velocity), there should be a preferred setup where Vc1<Vpt and Vpt=Vc2. This arrangement demonstrated considerably fewer jamming occurrences.

CONCLUSION

Various modifications and variations can be made in the present concepts without departing from the spirit or scope of the concepts. Note that object, item and package could be used interchangeably.

From the foregoing, it will be seen that these concepts are well adapted to obtain all the ends and objects herein set forth, together with other advantages which are obvious, and which are inherent to the structure.

As many possible embodiments may be made of the concepts without departing from the scope thereof, it is to be understood that all matter herein set forth or shown in the accompanying drawings is to be interpreted as illustrative and not in a limiting sense.

The invention claimed is:

1. A method of controlling the flow of objects conveyed by a conveyor along a conveying path, said method including the following steps:
   A) Monitoring said flow of objects;
   B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value;
   C) If after Step B, a predetermined time passes and overflow continues, then objects along said conveying path are buffered to a separate buffering conveyor;
   D) If during Step A, object jamming is detected on said conveying path, then objects along said conveying path are buffered to said separate buffering conveyor, wherein object jamming includes a determination that one or more objects are not moving due to at least one parcel being stopped at a location where it should otherwise be moving;
   E) If after Step D, a predetermined time passes and jamming continues, then said conveyor is stopped, and induction to said conveyor is also stopped; and
   F) If during Step A, overload is detected on the conveying path, then said conveyor is stopped, and induction to said conveyor is also stopped, wherein overload of a conveyor is determined by looking at amperage and how long the amperage draw goes above a threshold.

2. The method of controlling the flow of objects as claimed in claim 1, wherein in Step A, said flow monitoring is measured at least in part by sensing devices.

3. The method of controlling the flow of objects as claimed in claim 2, wherein said sensing devices include a light curtain.

4. The method of controlling the flow of objects as claimed in claim 2, wherein said sensing devices include a light sensor.

5. The method of controlling the flow of objects as claimed in claim 1, wherein in Step A, said conveying path can include a power turn conveyor, or the intersection of one or more conveyors.

6. The method of controlling the flow of objects as claimed in claim 1, wherein in Step B, said conveyor speed modification comprised speeding up said downstream conveyor portion.

7. The method of controlling the flow of objects as claimed in claim 1, wherein in Step B, said conveyor speed modification comprised slowing down said upstream conveyor portion.

8. The method of controlling the flow of objects as claimed in claim 1, wherein in Steps C and D, objects along said conveying path are buffered to said separate buffering conveyor in "first in last out" order.

9. The method of controlling the flow of objects as claimed in claim 1, wherein in Steps C and D, an induction conveyor is used between said conveyor path and said buffering conveyor.

10. A method of controlling the flow of objects conveyed by a conveyor along a conveying path, said method including the following steps:
   A) Monitoring said flow of objects;
   B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value;
   C) If after Step B, a predetermined time passes and overflow continues, then objects along said conveying path are buffered to a separate buffering conveyor;
   D) If during Step A, object jamming is detected on said conveying path, then objects along said conveying path are buffered to said separate buffering conveyor, wherein object jamming includes a determination that one or more objects are not moving due to at least one parcel being stopped at a location where it should otherwise be moving;
   E) If after Step D, a predetermined time passes and jamming continues, then said conveyor is stopped, and induction to said conveyor is also stopped;
   F) If during Step A, overload is detected on the conveying path, then said conveyor is stopped, and induction to said conveyor is also stopped, wherein overload of a conveyor is determined by looking at amperage and how long the amperage draw goes above a threshold; and
   G) If overload or jamming is corrected to suitable levels, parcels are debuffered back into the flow.

11. The method of controlling the flow of objects as claimed in claim 10, wherein in Step A, said conveying path can include a power turn conveyor, or the intersection of one or more conveyors.

12. The method of controlling the flow of objects as claimed in claim 10, wherein in Steps C and D, objects along said conveying path are buffered to said separate buffering conveyor in "first in last out" order.

13. The method of controlling the flow of objects as claimed in claim 10, wherein in Steps C and D, an induction conveyor is used between said conveyor path and said buffering conveyor.

14. The method of controlling the flow of objects as claimed in claim 10, wherein in Steps C and D, an induction conveyor used between said conveyor path and said buffering conveyor, said induction conveyor being configured to speed up and slow down in order to insert items into gaps between other items on said conveyor path.

15. The method of controlling the flow of objects as claimed in claim 10, further comprising the step of allowing for the manual removal of objects from said conveyor by operating personnel.

16. A method of controlling the flow of objects conveyed by a conveyor along a conveying path through a transition point, including the following steps:
   A) Monitoring said flow of objects;
   B) If during Step A, object overflow is detected on said conveying path, then conveyor speed along said path is modified such that the relative speed of a downstream portion of said conveyor is increased relative to the speed of an upstream portion of said conveyor, wherein object overflow includes a determination that the density of objects on said conveyor is higher than a predetermined upper value;
   C) If after Step B, a predetermined time passes and overflow continues, then objects along said conveying path are buffered to a separate buffering conveyor;
   D) If during Step A, object jamming is detected on said conveying path, then objects along said conveying path are buffered to a separate buffering conveyor, wherein object jamming includes a determination that one or more objects are not moving due to at least one parcel being stopped at a location where it should otherwise be moving;
   E) If after Step D, a predetermined time passes and jamming continues, then said conveyor is stopped, and induction to said conveyor is also stopped;
   F) If during Step A, overload is detected on the conveying path, then said conveyor is stopped, and induction to said conveyor is also stopped, wherein overload of a conveyor is determined by looking at amperage and how long the amperage draw goes above a threshold; and
   G) If overload or jamming is corrected to suitable levels, determining a window of opportunity in order to re-introduce buffered objects into a path, reintroducing objects by use of window of opportunity if overflow or jamming is fixed.

17. The method of controlling the flow of objects as claimed in claim 16, wherein in Step A, said conveying path can include a power turn conveyor, or the intersection of one or more conveyors.

18. The method of controlling the flow of objects as claimed in claim 16, wherein in Steps C and D, objects along said conveying path are buffered to said separate buffering conveyor in "first in last out" order.

19. The method of controlling the flow of objects as claimed in claim 16, wherein in Steps C and D, an induction conveyor is used between said conveyor path and said buffering conveyor, said induction conveyor being configured to speed up and slow down in order to insert items into gaps between other items on said conveyor path.

20. The method of controlling the flow of objects as claimed in claim 16, further comprising the step of allowing for the manual removal of objects from said conveyor by operating personnel.

\* \* \* \* \*